United States Patent [19]

Vaughters

[11] Patent Number: 5,353,662
[45] Date of Patent: Oct. 11, 1994

[54] TRANSMISSION SHUTTLE SHIFT DECELERATION METHOD

[75] Inventor: Kevin L. Vaughters, Altamont, Kans.
[73] Assignee: Deere & Company, Moline, Ill.
[21] Appl. No.: 10,942
[22] Filed: Jan. 29, 1993
[51] Int. Cl.[5] .............................................. B60K 20/10
[52] U.S. Cl. ..................................... 74/336 R; 74/335
[58] Field of Search ............................ 74/335, 336 R; 192/0.032; 364/424.1

[56] References Cited

U.S. PATENT DOCUMENTS

| | | | |
|---|---|---|---|
| 4,768,636 | 9/1988 | Ito et al. | 74/872 X |
| 4,843,902 | 7/1989 | Patton et al. | 74/335 |
| 4,864,881 | 9/1989 | Beeson et al. | 74/360 |
| 4,914,983 | 4/1990 | Simonyi et al. | 74/866 |
| 4,989,470 | 2/1991 | Bulgrien | 74/335 |
| 5,012,690 | 5/1991 | Bulgrien | 74/335 |
| 5,036,718 | 8/1991 | Bulgrien | 74/335 |
| 5,082,097 | 1/1992 | Goeckner et al. | 192/0.032 |

*Primary Examiner*—Dirk Wright
*Assistant Examiner*—Khoi Q. Ta

[57] ABSTRACT

A powershift transmission includes a plurality of clutches, including a final or directional set of clutches. The clutches are controlled by electro-hydraulic direct acting valves and two electro-hydraulic proportional or pressure modulating valves. The pressure modulating valves modulate the pressure supplied to the direct acting valves associated with the three directional clutches. Vehicle deceleration during a shuttle shift is achieved by releasing (unpressurizing) all clutches, then gradually pressurizing only two clutches in the final or directional set.

3 Claims, 4 Drawing Sheets

TRANSMISSION SHUTTLE SHIFT DECELERATION METHOD

BACKGROUND OF THE INVENTION

This invention relates to a vehicle transmission control system, in particular a method for shuttle shifting a powershift transmission having solenoid valve operated transmission control elements, such as brakes and clutches.

Power shift transmissions are known in the art. A control system for a known powershift transmission such as a Funk 8000 Series powershift transmission is described in U.S. Pat. No. 4,989,470, issued Feb. 5, 1991 to Bulgrien. This powershift transmission includes an initial set of three clutches, an intermediate set of three clutches and a final or directional set of three clutches. The clutches are controlled by nine electro-hydraulic 3-way, 2-position direct acting valves and two electro-hydraulic proportional or pressure modulating valves. The pressure modulating valves modulate the pressure supplied to the direct acting valves associated with the three directional clutches. Such powershift transmissions may be controlled to provide a shuttle shift capability which permits the vehicle to slow down and then change direction of operation without requiring the movement of the gearshift lever through each intermediate gear ratio. One such shuttle shifting method is described in the above mentioned patent to Bulgrien, wherein all clutches in an initial set of clutches are released to disconnect the engine from the drive train, at least two clutches in an intermediate set of clutches are engaged to lock up the transmission, at least one clutch in a final set of clutches is engaged to reduce vehicle speed to zero, then after the vehicle speed has been reduced to zero, one clutch in each set is engaged to engage the desired new gear ratio. Thus, this method requires that a minimum of at least three clutches be operated merely to decelerate the vehicle during a shuttle shift. It would be desirable to decelerate the vehicle during a shuttle shift with fewer clutch operations in order to increase system reliability.

SUMMARY OF THE INVENTION

An object of the invention is to provide a method for shuttle shifting a powershift transmission which has improved reliability and which requires manipulation of the least possible number of clutches and valves.

These and other objects are achieved by the present invention, wherein a powershift transmission includes a plurality of clutches, including a final or directional set of clutches. The clutches are controlled by electro-hydraulic direct acting valves and two electro-hydraulic proportional or pressure modulating valves. The pressure modulating valves modulate the pressure supplied to the direct acting valves associated with the three directional clutches. Vehicle deceleration during a shuttle shift is achieved by releasing (unpressurizing) all clutches, then gradually pressurizing only two clutches in the final or directional set.

DETAILED DESCRIPTION

Figure 1:
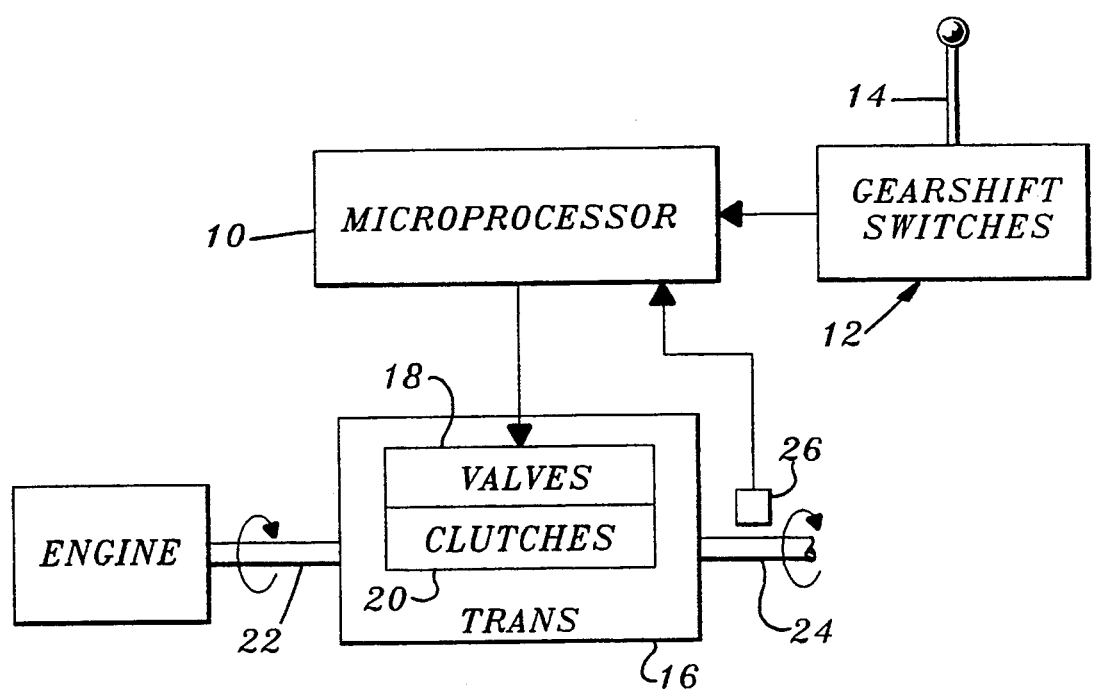
FIG. 1 is a schematic diagram of a powershift transmission control system to which the present invention is applicable.
Figure 2:
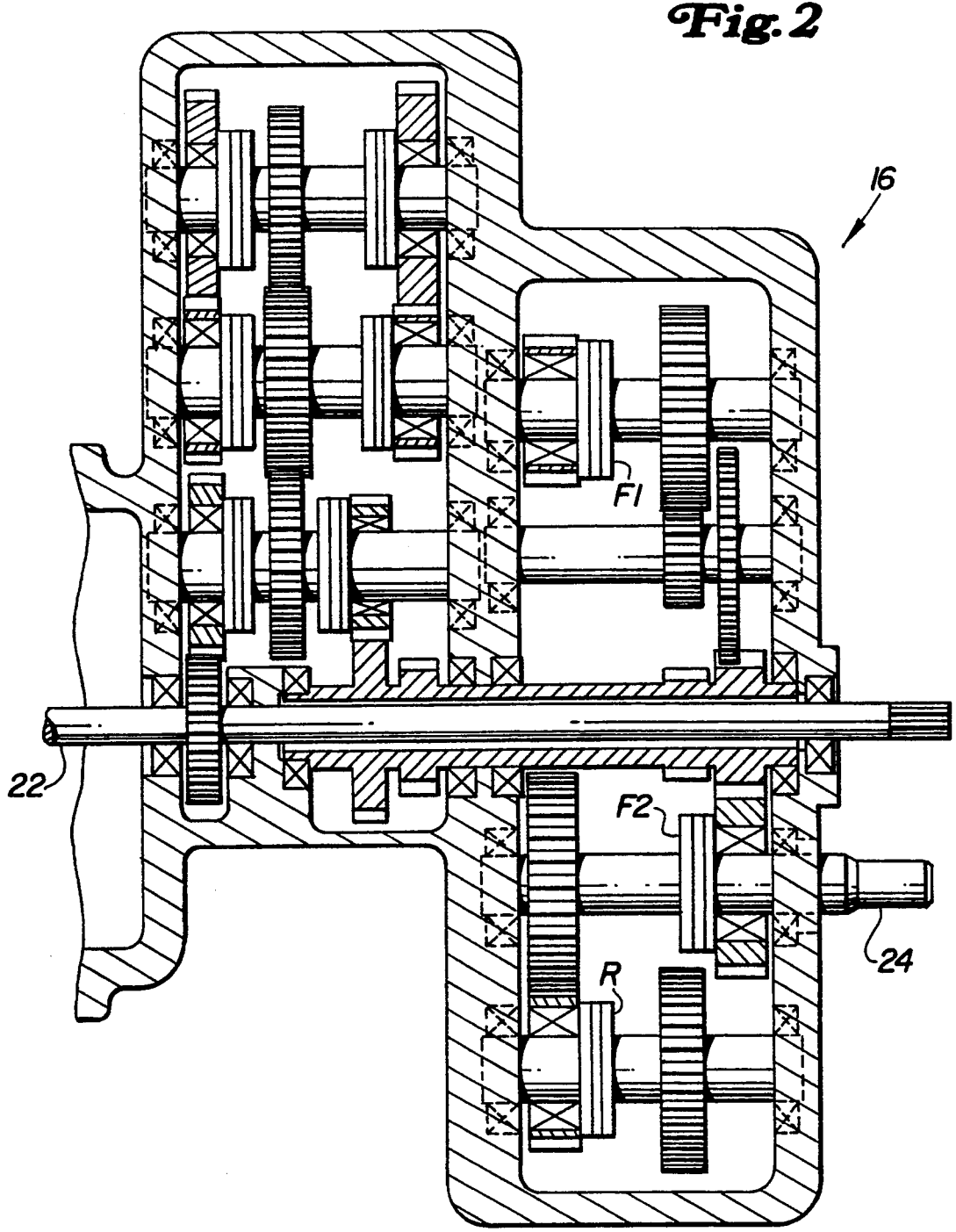
FIG. 2 is a schematic sectional view of a transmission to which the present invention is applicable.

Referring to FIG. 1, a power shift transmission control system includes a microprocessor 10, a gearshift lever transducer or switch assembly 12 which is operated by manually moving a gearshift lever 14, and a power shift transmission 16. The power shift transmission 16 is preferably a known power shift transmission such as the 8000 Series transmission manufactured by Funk Manufacturing. This known power shift transmission includes a hydraulic control valve assembly 18 which controls a plurality of hydraulically operated clutches 20, including directional clutches F1, F2 and R as best seen in FIG. 2. The transmission transmits power from an engine driven input shaft 22 to an output or vehicle drive shaft 24. A sensor 26 senses rotation of shaft 22 to provide output signals representing vehicle speed.

Preferably, the gearshift lever 14 will have forward, neutral and reverse positions, may have upshift and downshift sub-positions associated with the forward and reverse positions, and may be moved directly from a forward to a reverse position or from a reverse to a forward position to acomplish what is known as a "shuttle shift". The microprocessor 10 periodically samples the position of the lever 14 controls the operation of the valves 18 and clutches 20 accordingly.

Referring now to FIG. 2, the transmission 16 includes a final or directional set of clutches including clutches F1, F2 and R. The present invention concerns the method in which clutches F1, F2 and R are operated to decelerate the vehicle (not shown) in which the transmission 16 is installed during a shuttle shift operation.

Figure 3:
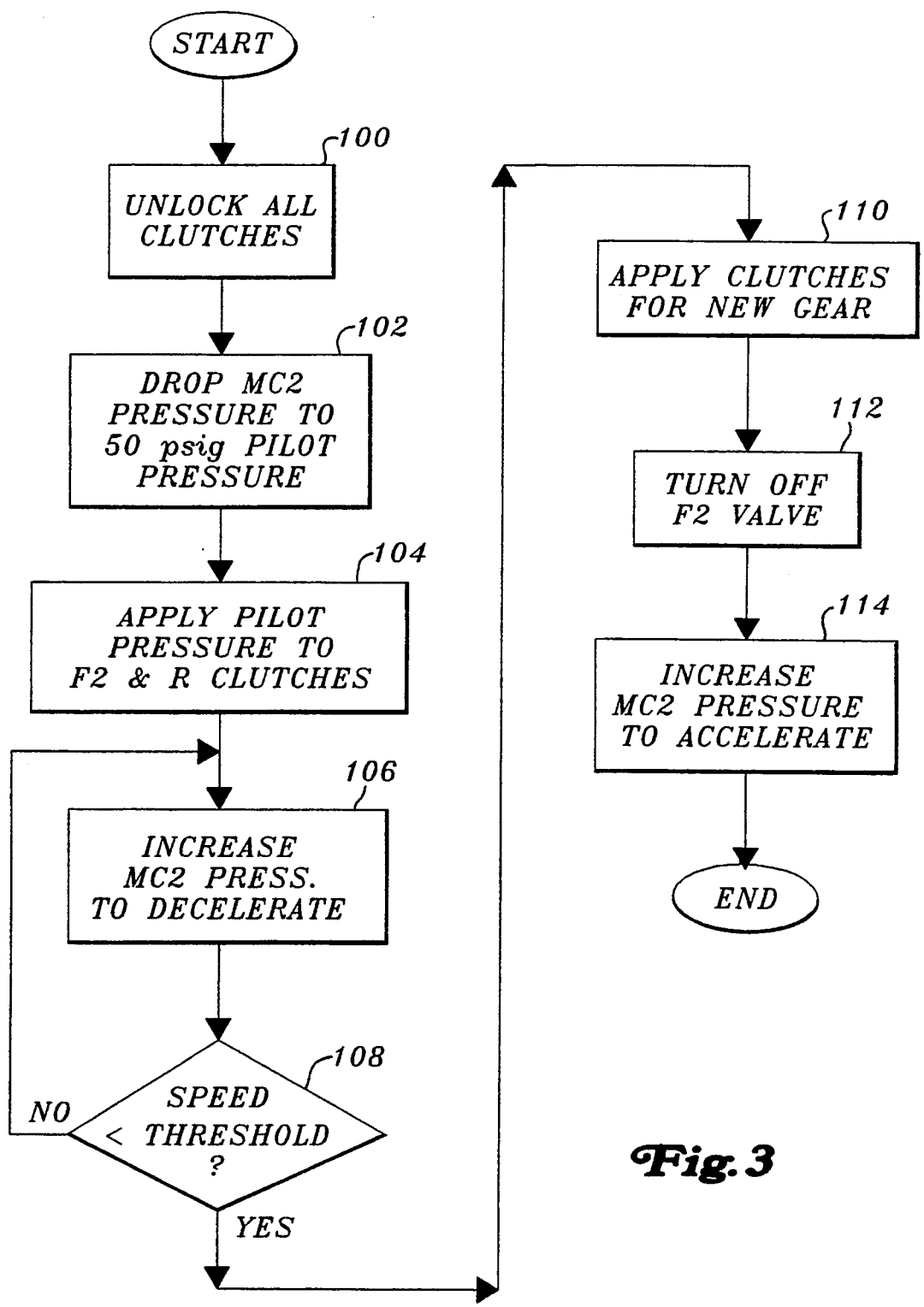
FIG. 3 is a simplified logic flow diagram of an algorithm which is perfumed by the method of the present invention during a forward-to-reverse shuttle shift.

Referring now to FIG. 3, a shuttle shift from a gear in the forward range to a gear in the reverse range is accomplished as follows:

First, all the clutches are unlocked (step 100). Then, sufficient current is applied to the MC2 proportional valve (which controls the pressure to clutches F2 and R) to drop the pilot pressure to a pressure just sufficient to cause initial clutch engagement, for example, approximately 50 psig. (step 102). Next, this pilot pressure is applied to the F2 and R clutches (step 104). Since clutch R possesses a torque advantage relative to the output, clutch R will lock up and clutch F2 will slip.

Then, the pressure supplied to clutches F2 and R (by the MC2 proportional valve) is modulated or increased to achieve a gradual and controlled deceleration of the tractor. For example, a feed-back loop might be used to adjust the pressure applied to clutches F2 and R as a function of the rate of deceleration as indicated by a transmission output speed sensor (steps 106 and 108). As a result the F2 clutch, alone, will absorb energy and begin to decelerate the tractor.

Once the tractor has come to rest, or to a predetermined ground speed, one or more clutches would be applied to place the transmission in the desired gear for movement in the opposite direction (step 110), and pressure is released from the F2 clutch (step 112) while pressure is maintained in clutch R.

Next, the pressure supplied to clutch R (by the MC2 proportional valve) is modulated or increased to achieve a gradual and controlled acceleration of the tractor in the new direction (step 114). Again, a feed-back loop might be used to control the acceleration rate of the tractor.

Figure 4:
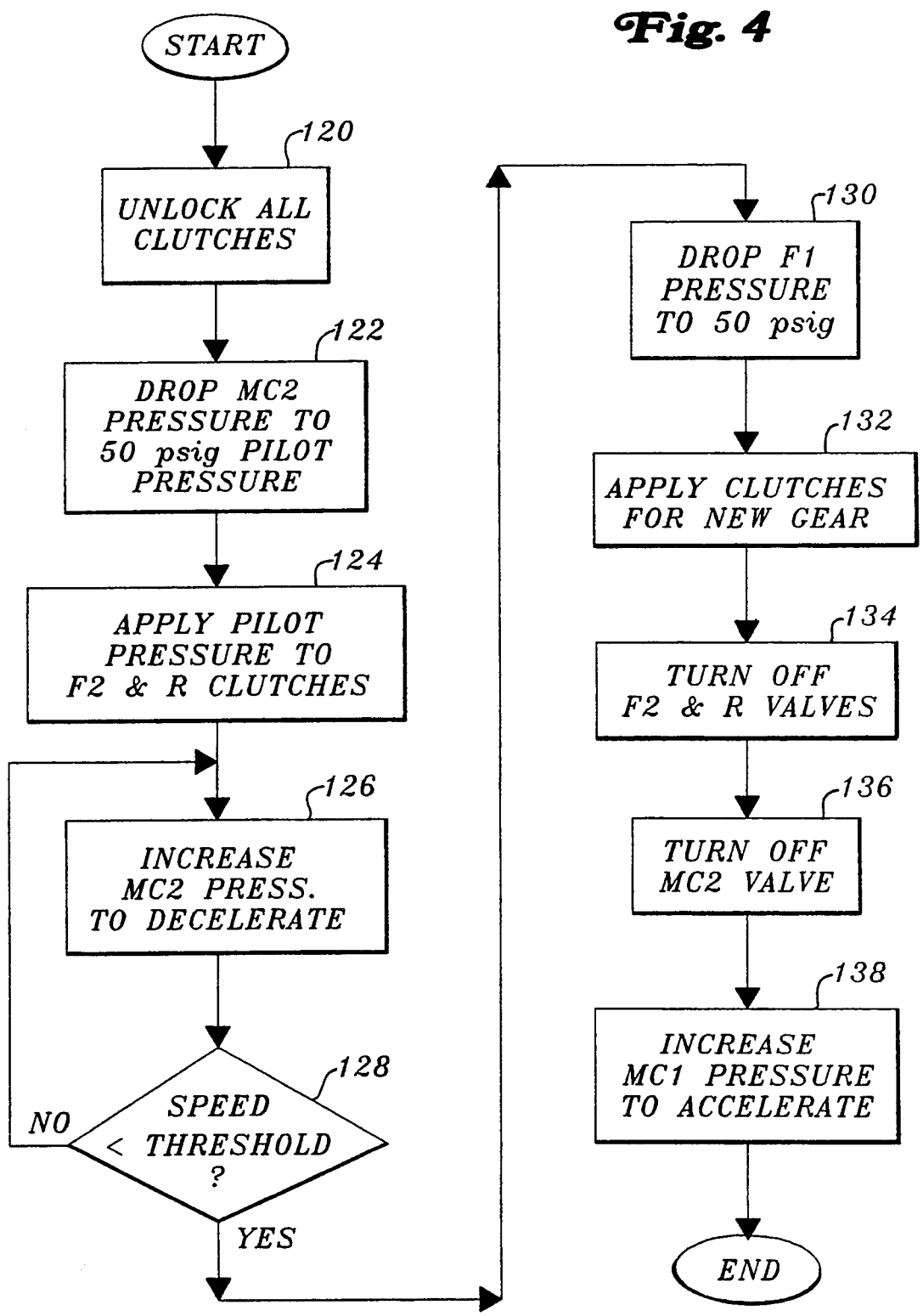
FIG. 4 is a simplified logic flow diagram of an algorithm which is performed by the method of the present invention during a reverse-to-forward shuttle shift.

Referring now to FIG. 4, a shuttle shift from a gear in the reverse range to a gear in the forward (low) range is accomplished as follows:

First, all the clutches are unlocked (step 120). Then, sufficient current is applied to the MC2 proportional valve (which controls the pressure to clutches F2 and R) to drop the pilot pressure to a pressure just sufficient to cause initial clutch engagement, for example, approximately 50 psig (step 122). Next, this pilot pressure is applied to the F2 and R clutches (step 124). Since clutch R possesses a torque advantage relative to the output, clutch R will lock up and clutch F2 will slip.

Then, the pressure supplied to clutches F2 and R (by the MC2 proportional valve) is modulated or increased to achieve a gradual and controlled deceleration of the tractor. For example, a feed-back loop might be used to adjust the pressure applied to clutches F2 and R as a function of the rate of deceleration as indicated by a transmission output speed sensor (steps 126 and 128). As a result the F2 clutch, alone, will absorb energy and begin to decelerate the tractor. Also, due to different clutch slip speeds, the pressure rise rate may be different for a reverse-to-forward shuttle shift as compared to a forward-to-reverse shuttle shift.

Once the tractor has come to rest, or a predetermined ground speed, modulation valve MC1 is controlled to pressurize clutch F1 with a pilot pressure just sufficient to cause initial clutch engagement, for example, approximately 50 psig (step 130). Then, one or more clutches would be applied to place the transmission in the desired gear for movement in the opposite direction (step 132), and pressure is released from the F2 and R clutches and current to the MC2 proportional valve is shut off (steps 134 and 136).

Next, the pressure supplied to clutch F1 (by the MC1 proportional valve) is modulated or increased to achieve a gradual and controlled acceleration of the tractor in the new direction (step 138). Again, a feed-back loop might be used to control the acceleration rate of the tractor.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A method of decelerating an output shaft of a vehicle powershift transmission during a shuttle shift whereby rotation of the output shaft is reversed from a first direction to a second direction, the transmission having a plurality of hydraulic pressure operated clutch elements for shifting the transmission, including a set of directional clutches, the method comprising the following steps:

disengaging all the clutch elements, including all the directional clutches;

applying pressurized fluid to only to both a first directional clutch and to a second directional clutch to lock up the transmission;

when the output shaft speed is less than a threshold value, applying pressurized fluid to at least one selected clutch other than a directional clutch to engage a desired gear and to cause the output shaft to rotate in the second direction; and releasing pressure from at least the first directional clutch.

2. The method of claim 1, wherein:

the pressure applied to the first and second directional clutches is gradually increased to gradually decelerate the output shaft in.

3. The method of claim 1, further comprising:

gradually increasing the pressure applied to a directional clutch to gradually accelerate the output shaft in the second direction.

* * * * *

UNITED STATES PATENT AND TRADEMARK OFFICE
CERTIFICATE OF CORRECTION

PATENT NO. : 5,353,662

DATED : 11 October 1994

INVENTOR(S) : Kevin L. Vaughters

It is certified that error appears in the above-identified patent and that said Letters Patent is hereby corrected as shown below:

In Col. 4, line 36, delete "in".

Signed and Sealed this

Twenty-fifth Day of April, 1995

*Attest:*

BRUCE LEHMAN

*Attesting Officer*     *Commissioner of Patents and Trademarks*